3,078,276
2 - SUBSTITUTED - PHENYL-Δ¹-PYRROLINES AND Δ¹-TETRAHYDROPYRIDINES AND 4,4'-BIS-(Δ¹-PYRROLINYL - 2 AND Δ¹ - TETRAHYDROPYRIDYL-2)-PHENOXY-LOWER ALKANES
Walter Koller and Paul Schlack, Frankfurt am Main, Germany, assignors to Farbwerke Hoechst Aktiengesellschaft vormals Meister Lucius & Brüning, Frankfurt am Main, Germany, a corporation of Germany
No Drawing. Filed Apr. 28, 1960, Ser. No. 25,235
Claims priority, application Germany Apr. 30, 1959
8 Claims. (Cl. 260—326.5)

It is already known to prepare 2-aryl-pyrrolines showing a double bond in 1,2-position. However, the processes hitherto known are comparatively complicated and require several reaction stages.

This invention relates to substituted heterocyclic bases of the formulae

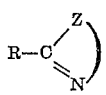

and

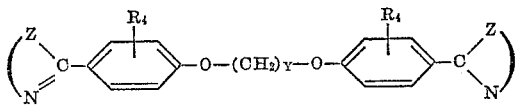

wherein Z is trimethylene or tetramethylene, R is one of the formulae

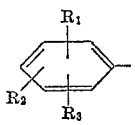

and

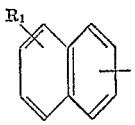

in which $R_1$ is hydroxy, methoxy, methylthio, halogenalkoxy of up to two carbon atoms, or carbomethoxy; $R_2$ is hydrogen, chlorine, methyl, methoxy, or, taken together with $R_1$, an ethylenedioxy group; $R_3$ is hydrogen or methoxy; $R_4$ is hydrogen or methoxy; and Y is an integer from 2 to 4, and to acid addition salts of said compounds with organic carboxylic acids having up to seven carbon atoms or inorganic acids. These compounds are obtainable in a smooth and single stage reaction and with a good yield by condensing an aromatic alkoxy compound of the group consisting of

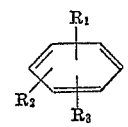

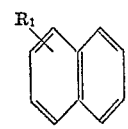

and

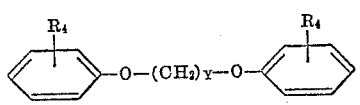

in which $R_1$, $R_2$, $R_3$, $R_4$ and Y have the meanings given above in polyphosphoric acid with primary gamma- or delta-amino-carboxylic acids or their salts or their functional reactive derivatives.

When using gamma-amino-carboxylic acids, 2-aryl-Δ¹-pyrrolines are obtained according to the invention. When starting from resorcinol dimethyl ether and from gamma-amino-butyric acid the reaction proceeds according to the following scheme of formulae:

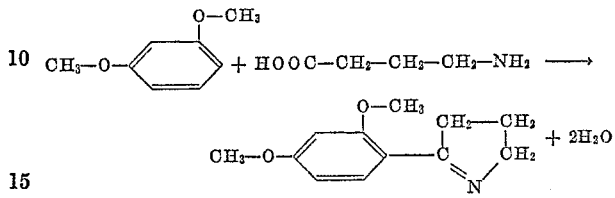

2-(2,4-dimethoxy-phenyl)-Δ¹-pyrroline.

When using delta-amino-carboxylic acids there are formed 2-aryl-Δ¹-tetrahydropyridine. The reaction of thioanisole and delta-amino-valeric acid hydrochloride proceeds for example according to the following scheme of formulae:

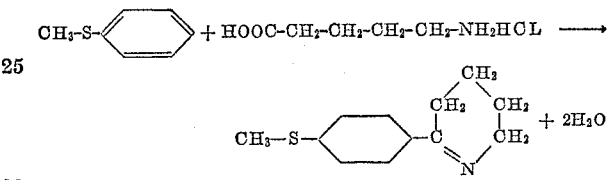

2-(4-methylmercapto-phenyl)-Δ¹-tetrahydropyridine.

The following compounds are, for example, suitable as starting materials in the methods of this invention: ortho- and para-cresol, anisole, phenetol, ortho-chloranisole, para-chlorophenetol, para-cresol-monomethyl ether, ortho-cresol-mono-n-propyl ether, β-bromethylphenyl ether, gamma-chloropropylphenyl ether, n-propyl-phenyl ether, n-butyl ether, para-tert. butyl-phenyl-methyl ether, resorcinol dimethyl ether, resorcinol methyl ethyl ether, veratrol, hydroquinone dimethyl ether, benzodioxane, pyrogallol-1,2-diethyl ether, pyrogallol trimethyl ether, 1,2-dimethyl-3,4,5-trimethoxy-benzene, phenoxy-ethyl bromide, 2-methoxy-benzoic acid methyl ester, methyl-phenyl sulfide, ethyl-phenyl sulfide, 1-methoxy-naphthalene, 2-ethoxy-naphthalene, 1,2-diphenoxy-ethane, 1,2-bis-(2-methoxy-phenoxy)-ethane, 1,2-bis(2'-ethoxy - phenoxy) - propane, 1,2-bis-(2-methoxy-phenoxy)-butane and 1,6-diphenoxy-hexane. The reaction is only successful and the yields are only satisfactory if the reaction components are soluble in polyphosphoric acid. In view of their good reactivity and their good solubility in polyphosphoric acid, phenyl ethers and phenyl-thioethers containing low molecular alkyl groups are particularly suitable as starting substances, whereas corresponding compounds with alkyl radicals of higher molecular weight generally give small yields. The smaller yields in the case of ethers containing alkyl radicals of higher molecular weight and in the case of naphthalene derivatives will most likely be due to their lower solubility in polyphosphoric acid. The reaction velocity reduced owing to the lesser solubility most likely leads to side reactions, in the course of which lactams may, for example, be formed.

As reaction components of the aromatic radicals R there may be used primary gamma- and delta-amino-carboxylic acids, for example, γ-amino-butyric acid, γ-amino-valeric acid, γ-methyl-γ-amino-valeric acid, δ-amino-valeric acid, δ-amino-caproic acid, β,β'-diamino-adipic acid, their anionic or cationic salts or their reactive functional derivatives. For salt formation any desired mineral acids or bases may be used. There may for example be mentioned: hydrohalic acids such as hydrochloric or hydrobromic acid, phosphoric acid, sodium or potassium hydroxide. The salts of the amino acids have to be soluble, at least in the heat, in polyphosphoric acid in order to guarantee a reaction. Their dissolution in polyphosphoric acid can also be effected while a volatile acid, such as hydrogen fluoride or hydrogen chloride is set free. Instead of the free aminocarboxylic acids there may also be used their reactive functional derivates, for example the corresponding esters with low molecular alcohols such as methanol or ethanol. The hydrochlorides of the amino-carboxylic acid esters may likewise be used as starting substances.

The reaction is advantageously carried out in a manner such that the reaction components, one of which can also be applied in excess, are heated in about 4 to 8 times the quantity by weight of polyphosphoric acid having a content of 75 to 85% by weight of $P_2O_5$, until the reaction is terminated. As regards the temperature to be applied and the reaction time, the reaction conditions can be varied within comparatively wide limits according to the reactivity of the compounds used as starting substances. Generally it is of advantage to operate at temperatures between about 60° C. and 150° C. In many cases the reaction is also successful at lower temperatures. The reaction may, for example, also be carried out at room temperature, in which case, however, allowance has to be made for prolonged reaction times. Generally, it is advantageous to operate at temperatures being as high as possible but in the latter case care has to be taken that undesired side reactions are prevented or do at least not occur to an extent worth mentioning. Thus, it is possible in a comparatively short time to obtain very good, sometimes even quantitative, yields.

In some cases the reaction in the polyphosphoric acid proceeds with dealkylation of an alkoxy group in ortho-position, such as, for example the reaction of pyrogallol trimethyl ether with $\gamma$-amino-butyric acid above a certain reaction temperature (about 50° C.).

For processing, the reaction mixture is suitably diluted with water and the base formed is precipitated by neutralization or alkalization. If the reaction products are of phenolic nature it is generally of advantage to avoid an excess of alkali leading to the formation of phenolates unless it is possible and intended to isolate the reaction product as sparingly soluble alkali metal phenolate. In many cases the bases can advantageously be separated from the reaction mixture diluted with water by means of mineral or organic acids in the form of sparingly soluble salts, for example of perchlorates or picrates, the compounds being obtained in a particularly pure form. The products of the present invention as far as they are obtained in the form of free bases can be transformed into the corresponding salts by means of physiologically tolerable organic or inorganic acids. As organic acids there are mentioned, for example acetic acid, propionic acid, malonic acid, succinic acid, tartaric acid, citric acid, malic acid, salicylic acid, aceturic acid. As inorganic acids there enter into consideration, for instance hydrohalic acids, such as hydrochloric and hydrobromic acid, sulfuric acid, phosphoric acid and amido-sulfonic acid.

The salts of the bases obtained according to the process of the present invention are distinguished, as a rule, by an excellent crystallizing power. The free bases likewise crystallize well. Some of the new products of the invention show a strong fluorescence in ultraviolet light.

In view of their imine structure it is a very remarkable property of the heterocyclic bases that they are extremely stable to strong acids, even in the heat. Thus, the compounds of the present invention are in contrast to the higher analogs with 7 ring members (for example aza-cycloheptenes) with a double bond in 1,2-position which are very easily split, for example already at room temperature, by means of acids to form the salts of the corresponding amino-ketones.

The products of the invention containing alkyl-thio-ether groups in ortho- or in para-position to the hetero-cyclic substituent dissolve in concentrated strong acids, such as sulfuric acid or perchlorid acid, with an intense color, in which case quinoidal sulfonium compounds are obviously formed. These rearrangements are reversible.

The heterocyclic bases or salts thereof obtained according to the process of the present invention partly possess valuable properties or constitute intermediate products for the preparation of compounds being suitable for many purposes. As far as the products are distinguished by marked fluorescence they may, for example, be used as optical brighteners or absorbers for ultraviolet light. By many textile fibers, for example by those containing acid groups, such as polyacrylonitrile fibers, the heterocyclic bases are strongly taken up from warm, aqueous baths.

Furthermore, the products of the invention can partly be used as medicaments, in particular as agents favorably influencing the blood vascular circulation or the blood pressure. For example, in the test on the perfused, isolated rabbit's ear according to Pissemski (cf. Pflügers Archiv, 156 (1914), page 426) the compounds 2-(2,4-dimethoxy-phenyl - $\Delta^1$ - pyrroline hydrochloride, 2 - (2-methylmercapto-phenyl)-$\Delta^1$-pyrroline hydrochloride, 2-(4-methoxy-phenyl)-$\Delta^1$-tetrahydropyridine hydrochloride, and 2-(4'-methoxy-phenyl) - $\Delta^1$-pyrroline hydrochloride cause already a marked contraction of the vessels when administered in doses between 50$\gamma$ and 10 mg. Furthermore, in the test on the narcotized cat the compounds 2-(4-methoxy-phenyl)-$\Delta^1$-tetrahydropyridine hydrochloride and 2-(4-methoxy-phenyl)-$\Delta^1$-pyrroline hydrochloride cause a strong and long-lasting increase of the blood pressure.

The following examples illustrate the invention but they are not intended to limit it thereto:

*Example 1*

10.31 grams of gamma-amino-butyric acid, 13.82 grams of pyrocatechol dimethyl ether and 180 grams of polyphosphoric acid ($P_2O_5$ content about 80%) are heated, while stirring mechanically, for 3 hours at 100° C. The whole is allowed to cool and the claret, sirupy reaction mixture that has formed is introduced into about 800 cc. of water. After elimination of the veratrol, that has not reacted, by shaking the phosphoric acid solution with ether, the solution is diluted by means of water to about 3 times its volume in order to prevent the precipitation of alkali metal phosphates which normally takes place when alkali metal hydroxides are added. The solution is then made alkaline (pH>10) by means of a 10 N sodium hydroxide solution whereupon the pyrroline base separates partly in form of an oil and partly in an emulsified form. From the mixture the base is extracted by means of ether, the ether solution is washed with water until free from alkali and dried over sodium sulfate. After evaporation of the solvent there is obtained [2-(2,3-dimethoxy-phenyl)-$\Delta^1$-pyrroline] as greenish-yellow oil which solidifies on cooling in the form of crystals. After dissolution in ether and treatment of the ether solution by means of charcoal there are obtained colorless crystals melting at 89° C. The base distils in the bulb tube at an air bath temperature of 108° C. under a pressure of 0.03 mm. of mercury. The yield amounts to 19.6 grams (96% of the theoretical yield). The hydrochloride of the base prepared by addition of hydrogen chloride/ether to the ether solution of the base forms colorless prisms (recrystallized from alcohol) which melt at 225° C. with decomposition. The corresponding perchlorate (colorless needles from water, prepared by dissolving the base in dilute hydrochloric acid and adding perchloric acid of 35% strength) melts at 241° C. If, instead of the free $\gamma$-amino-butyric acid, the corresponding hydrochloride or the hydrochloride of the $\gamma$-amino-butyric acid ethyl ester is used and if otherwise the aforementioned method of working is applied, the 2-(2,3-dimethoxy-phenyl)-$\Delta^1$-pyrroline is formed in a somewhat smaller yield.

*Example 2*

10.31 grams of gamma-amino-butyric acid, 13.82 grams of resorcinol dimethyl ether and 180 grams of polyphosphoric acid ($P_2O_5$ content about 80%) are heated, while continuously stirring mechanically, for 3 hours at 100° C. The violet reaction mixture is worked up as indicated in Example 1. The 2-(2,4-dimethoxy-phenyl)-$\Delta^1$-pyrroline is obtained by evaporation of the ether extracts in the form of a viscous, red-brown oil which, after treatment with charcoal, crystallizes from petroleum ether in the form of colorless rhombs melting at 51° C. The base distils in the bulb tube at an air bath temperature of 106–108° C. under a pressure of 0.05 mm. of mercury.

The yield amounts to 16.4 grams (80% of the theoretical yield). Hydrochloride: melting point 207–208° C., colorless prisms from alcohol/ether. Perchlorate: melting point 197° C., colorless needles from water.

*Example 3*

10.31 grams of gamma-amino-butyric acid, 10.81 grams of anisol and 180 grams of polyphosphoric acid ($P_2O_5$ content about 80%) are heated, while stirring mechanically, for 12 hours at 100° C. The red reaction mixture is worked up as described in Example 1. By evaporation of the ether extracts the 2-(4-methoxy-phenyl)-$\Delta^1$-pyrroline is obtained in the form of a greenish oil which solidifies on cooling in the form of crystals. The product crystallizes from ether in the form of colorless needles melting at 73–73.5° C. In the bulb tube the base distils at an air bath temperature of 95° C. under a pressure of 0.03 mm. of mercury.

Yield: 13.8 grams (78.8% of the theoretical yield).

If anisole is used in double the quantity, the yield amounts to 96% of the theory after heating for 3 hours. Hydrochloride: melting point 208° C., colorless needles obtained by recrystallization from alcohol/petroleum ether. Perchlorate: melting point 190° C., colorless needles obtained by recrystallization from water.

*Example 4*

10.31 grams of gamma-amino-butyric acid, 16.82 grams of pyrogallol trimethyl ether and 180 grams of polyphosphoric acid ($P_2O_5$ content about 80%) are heated, while stirring mechanically, for 72 hours at 40° C. The dark red sirupy solution is worked up as described in Example 1. By evaporation of the ether extracts there is obtained the (2,3,4-trimethoxy-phenyl)-$\Delta^1$-pyrroline in the form of a brown oil which solidifies on cooling in the form of crystals. After treatment with charcoal the product crystallizes from petroleum ether in the form of slightly yellowish needles melting at 48° C.

Yield: 18.6 grams (80% of the theoretical yield).

The base distils in the bulb tube at an air bath temperature of 107° C. under a pressure of 0.03 mm. of mercury.

Hydrochloride: melting point 160° C., colorless, thin prisms obtained by recrystallization from methylethyl ketone/alcohol. Perchlorate: melting point 181° C., colorless needles (recrystallized from water). At a reaction time of 17 hours the yield amounts to 62% of the theoretical yield.

At higher temperatures there is obtained with demethylation of a methoxy group the 2-(2-hydroxy-3,4-dimethoxy-phenyl)-$\Delta^1$-pyrroline. According to the reaction temperature chosen it is either obtained in admixture with the trimethoxy compound for example at 55° C., or as single reaction product in the form of yellow needles melting at 101° C. (from ligroin after treatment with charcoal), for example at 75° C.

Hydrochloride: melting point 184–185° C., colorless prisms obtained by recrystallization from alcohol/ether.

Perchlorate: melting point 223° C., colorless needles obtained by recrystallization from water.

*Example 5*

10.31 grams of gamma-amino-butyric acid, 12.41 grams of thioanisole and 180 grams of polyphosphoric acid ($P_2O_5$ content about 80%) are heated, while stirring mechanically, for 3 hours at 100° C. The whole is allowed to cool and the yellow, sirupy reaction mixture is then introduced into about 600 cc. of water. After dilution with water to about 3 times its volume the solution obtained is made alkaline (pH>10) by means of a 10 N sodium hydroxide solution while cooling with ice, whereupon the pyrroline base separates mainly in solid form at the surface. The solution with the precipitate is extracted by means of ether, the ether phase is washed with water until free from alkali and is then dried over sodium sulfate. After evaporation of the solvent there is obtained the 2-(4-methyl-mercaptophenyl)-$\Delta^1$-pyrroline in the form of almost colorless crystals. After recrystallization from petroleum ether the compound forms colorless needles melting at 102° C., and boils at an air bath temperature of 105° C. under a pressure of 0.02 mm. of mercury.

Yield: 17.1 grams (90% of the theoretical yield, calculated upon the gamma-amino-butyric acid used).

If thioanisole is used in an excess of 10%, the yield is raised to 95.3% calculated upon the gamma-amino-butyric acid.

Hydrochloride: melting point 222° C., colorless needles obtained by recrystallization from alcohol.

Perchlorate: melting point 201° C., colorless needles obtained by recrystallization from water.

*Example 6*

10.31 grams of gamma-amino-butyric acid, 12.21 grams of 2-methoxy-toluene and 180 grams of polyphosphoric acid ($P_2O_5$ content about 80%) are heated, while stirring, for 3 hours at 100° C. The claret, sirupy solution is worked up as described in Example 1. By evaporation of the ether extracts the 2-(4-methoxy-3-methyl-phenyl)-$\Delta^1$-pyrroline is obtained as a brown oil which solidifies on cooling in the form of crystals. After treatment with charcoal the compound forms colorless needles melting at 51° C. (from petroleum ether). The base distils in the bulb tube at an air bath temperature of 88° C. under a pressure of 0.03 mm. of mercury.

Yield: 15.7 grams (83% of the theoretical yield).

Hydrochloride: melting point 271° C., colorless needles (from alcohol).

Perchlorate: melting point 148° C., colorless needles (from water).

If, instead of 2-methoxy-toluene, 4-methoxy-toluene is used the 2-(2-methoxy-5-methyl-phenyl)-$\Delta^1$-pyrroline is obtained in a yield of 73%. In ultraviolet light the compound shows a blue-violet fluorescence. After distillation in the bulb tube at an air bath temperature of 78° C. under a pressure of 0.03 mm. of mercury a colorless oil is obtained which solidifies at 14.5–15° C.

Hydrochloride: melting point 204.5–205° C., colorless prisms (from alcohol/ether).

Perchlorate: melting point 283° C., colorless needles (from water).

*Example 7*

10.31 grams of gamma-amino-butyric acid, 13.61 grams of pyrocatechol ethylene ether and 180 grams of polyphosphoric acid ($P_2O_5$ content about 80%) are heated, while stirring mechanically, for 3 hours at 100° C. The dark red sirupy solution is worked up as described in Example 1. By evaporation of the ether extracts the 2-(3,4-ethylene-dioxy-phenyl)-$\Delta^1$-pyrroline is obtained in the form of a yellow oil which solidifies on cooling in the form of crystals. Yield: 90.4 grams (95% of the theoretical yield). After distillation in the bulb tube at an air bath temperature of 105° C. under a pressure of 0.03 mm. of mercury and after recrystallization from ether/petroleum ether with addition of charcoal there are obtained colorless needles melting at 80° C.

Hydrochloride: melting point 205° C., colorless crystals (from alcohol/petroleum ether).

Perchlorate: melting point 149.5° C., colorless needles (from water).

Example 8

10.31 grams of gamma-amino-butyric acid, 14.26 grams of 2-chloranisole and 180 grams of polyphosphoric acid ($P_2O_5$ content about 80%) are heated, while stirring mechanically, for 24 hours at 100° C. The reddish, sirupy reaction mixture is worked up as described in Example 1. The evaporation residue of the ether extracts, the 2-(3-chloro-4-methoxy-phenyl)-$\Delta^1$-pyrroline, consists of a yellow, smeary oil which solidifies on cooling. After treatment with animal charcoal and dissolution and precipitation from petroleum ether the product forms colorless needles melting at 74° C. The base distils in the bulb tube at an air bath temperature of 118° C. under a pressure of 0.03 mm. of mercury. Yield: 15.05 grams (72% of the theoretical yield).

Hydrochloride: melting point 244° C., colorless needles (from alcohol).

Perchlorate: melting point 160° C., colorless needles (from water).

Example 9

10.31 grams of gamma-amino-butyric acid, 20.10 grams of phenoxy-ethyl bromide and 180 grams of polyphosphoric acid ($P_2O_5$ content about 80%) are heated, while stirring, for 3 hours at 100° C. The brown-yellow, sirupy reaction mixture is worked up as described in Example 1. By evaporation of the ether extracts the 2-(4-$\beta$-bromethoxy-phenyl)-$\Delta^1$-pyrroline is obtained as a green-yellow oil which solidifies on cooling in the form of crystals. After treatment with animal charcoal the compound forms colorless needles melting at 106° C. (from petroleum ether). The base distils in the bulb tube at an air bath temperature of 118° C. under a pressure of 0.03 mm. of mercury. Yield: 13.6 grams (51% of the theoretical yield).

Hydrochloride: melting point 155.5–156° C., colorless needles (from alcohol/ether).

Example 10

10.31 grams of gamma-amino-butyric acid, 10.81 grams of para-cresol and 180 grams of polyphosphoric acid ($P_2O_5$ content about 80%) are heated, while stirring mechanically, for 48 hours at 130° C. The green-yellow sirupy reaction mixture is worked up as described in Example 1. Instead of ether, methylene chloride is advantageously used for extraction. By evaporation of the methylene chloride extracts the 2-(2-hydroxy-5-methylphenyl)-$\Delta^1$-pyrroline is obtained as dark red, smeary oil which solidifies on cooling in the form of crystals. After treatment with animal charcoal and recrystallization from petroleum ether there are obtained green-yellow prisms which strongly fluoresce in ultraviolet light and which melt at 80.5–81° C. The base distils in the bulb tube at an air bath temperature of 105° C. under a pressure of 0.03 mm. of mercury. Yield: 11.25 grams (64% of the theoretical yield).

Hydrochloride: melting point 258–259° C. (with decomposition, yellow-green fluorescence in ultraviolet light). When using ortho-cresol there is obtained, after a reaction time of 3 hours at 100° C., the 2-(4-hydroxy-3-methyl-phenyl)-$\Delta^1$-pyrroline in a yield of 24%. After treatment with animal charcoal, the product forms yellow-green needles strongly fluorescing in ultraviolet light and melting at 86° C. (from petroleum ether). It boils at an air bath temperature of 88° C. under a pressure of 0.03 mm. of mercury.

Hydrochloride: melting point 192° C., colorless needles (from alcohol/ether).

Perchlorate: melting point 189.5–190° C., colorless needles (from water).

Example 11

15.36 grams of delta-amino-valeric acid hydrochloride, 10.81 grams of anisole and 180 grams of polyphosphoric acid ($P_2O_5$ content about 83%) are heated to 100° C., while stirring mechanically, whereupon hydrogen chloride escapes. After 3 hours the dark red reaction mixture is worked up as described in Example 1. By evaporation of the ether extracts the 2-(4-methoxy-phenyl)-$\Delta^1$-tetrahydropyridine is obtained as light yellow oil which solidifies on cooling in the form of crystals. Yield: 16.4 grams (87% of the theoretical yield). By recrystallization from petroleum ether with addition of animal charcoal there are obtained colorless needles melting at 60° C. which gradually turn brown. The base distils in the bulb tube at an air bath temperature of 118° C. under a pressure of 0.03 mm. of mercury.

Hydrochloride: melting point 213.5–214.0° C., colorless needles (from alcohol/ether).

Perchlorate: melting point 137–137.5° C., colorless needles (from water).

Example 12

15.36 grams of delta-amino-valeric acid hydrochloride, 13.82 grams of pyrocatechol dimethyl ether and 180 grams of polyphosphoric acid ($P_2O_5$ content about 83%) are heated to 100° C., while stirring mechanically, whereupon hydrogen chloride escapes. After 1 hour the claret, sirupy reaction mixture is worked up as described in Example 1. By evaporation of the ether extracts the 2-(3,4-dimethoxy-phenyl) - $\Delta^1$ - tetrahydropyridine is obtained. The oil, which is at first yellow, crystallizes after some standing. Yield: 16.6 grams (76% of the theoretical yield). By recrystallization from petroleum ether with addition of animal charcoal there are obtained colorless, long needles melting at 78° C. The base distils in the bulb tube at an air bath temperature of 109° C. under pressure of 0.03 mm. of mercury.

Hydrochloride: 215.5–216.5° C., colorless needles (from alcohol/ether).

Perchlorate: melting point 223–223.5° C., colorless needles (from water).

Example 13

15.36 grams of delta-amino-valeric acid hydrochloride, 13.81 grams of resorcinol dimethyl ether and 180 grams of polyphosphoric acid ($P_2O_5$ cotent about 83%) are heated to 100° C., while stirring, whereupon hydrogen chloride escapes. After heating for 3 hours the whole is allowed to cool and the claret, sirupy reaction mixture formed is worked up as described in Example 1. By evaporation of the ether extracts the 2-(2,4-dimethoxyphenyl)-$\Delta^1$-tetrahydropyridine is obtained as red-brown, viscous oil. By distillation in the bulb tube at an air bath temperature of 115° C. under a pressure of 0.03 mm. of mercury a colorless oil is obtained which turns brown again after a short time. Yield: 19.6 grams (90% of the theoretical yield).

Hydrochloride: melting point 188° C., colorless rhombs (from alcohol/ether).

Perchlorate: melting point 187° C. colorless needles (from water).

Picrate: melting point 142° C.

Example 14

15.35 grams of delta-amino-valeric acid hydrochloride, 12.42 grams of thioanisole and 180 grams of polyphosphoric acid ($P_2O_5$ content about 83%) are heated, while stirring, to 75° C., whereupon hydrogen chloride escapes. After heating for 3 hours the green, sirupy reaction mixture is worked up as described in Example 1. By evaporation of the ether extracts the 2-(4-methylmercaptophenyl)-$\Delta^1$-tetrahydropyridine is obtained as green-yellow oil which, on cooling, crystallizes in the form of needles. Yield: 14.6 grams (71% of the theoretical yield). After treatment with animal charcoal the base crystallizes from petroleum ether in colorless lamellae melting at 70° C. The base dissolves in concentrated strong acids such as sulfuric acid and perchloric acid with deep green-blue color, obviously owing to the formation of a quinoidal sulfonium salt. When diluting with water the coloration disappears again. The substance boils at an air bath temperature of 105° C. under a pressure of 0.03 mm. of mercury.

Hydrochloride: melting point 192.5–193.5° C., colorless needles (from alcohol/ether).

Perchlorate: melting point 160.5–161° C., colorless needles (from water).

*Example 15*

15.36 grams of delta-amino-valeric acid hydrochloride, 16.88 grams of pyrogallol trimethyl ether and 180 grams of polyphosphoric acid ($P_2O_5$ content about 83%) are heated, while stirring, at 75° C., whereupon hydrogen chloride escapes. After a reaction time lasting 3 hours, the dark red, sirupy reaction mixture is worked up as described in Example 1. After evaporation of the ether extracts the 2-(2,3,4-trimethoxy-phenyl)-$\Delta^1$-tetrahydropyridine is obtained as a green-yellow oil, and after distillation in the bulb tube at an air bath temperature of 100° C. under a pressure of 0.03 mm. of mercury, as a weakly yellowish oil which gradually turns brownish. Yield: 16.1 grams (65% of the theoretical yield).

Hydrochloride: melting point 131.5–132° C., colorless small needles (from dimethyl formamide/ether and from alcohol/ether).

Perchlorate: melting point 139° C., colorless needles (from water/alcohol).

*Example 16*

10.31 grams of gamma-amino-butyric acid, 16.62 grams of 2-methoxybenzoic acid methyl ester and 180 grams of polyphosphoric acid ($P_2O_5$ content about 83%) are heated, while stirring mechanically, for 3 hours at 100° C. The brown, sirupy reaction mixture is worked up as described in Example 1. By evaporation of the ether extracts the 2-(4-methoxy-3-carbomethoxy-phenyl)-$\Delta^1$-pyrroline is obtained as a yellow-green oil which crystallizes after prolonged standing. Yield: 8.2 grams (35% of the theoretical yield). After recrystallization from ether there are obtained colorless, irregular crystals melting at 58–60° C.

Hydrochloride: melting point 201° C., colorless, small needles (from alcohol/petroleum ether).

Perchlorate: melting point 222° C., colorless needles and irregular crystals (from water/alcohol).

*Example 17*

10.31 grams of gamma-amino-butyric acid, 15.82 grams of 1-methoxy-naphthalene and 180 grams of polyphosphoric acid are heated, while stirring, for 12 hours at 75° C. After cooling the dark brown-green reaction mixture is introduced into ice water, whereupon the 2-(1-methoxy-naphthyl)-$\Delta^1$-pyrroline separates as yellow-brown phosphate being at first smeary. For elimination of any impurities it is dissolved in dilute hydrochloric acid and extracted by means of ether. In order to obtain the pyrroline base the clear hydrochloric acid solution is made alkaline by means of a 10 N sodium hydroxide solution and is then extracted by means of ether. The phosphoric acid solution is treated in the same way. The pyrroline base is obtained as evaporation residue of the combined ether extracts, after having been washed with water and dried over sodium sulfate, in the form of a yellow-brown oil which crystallizes on cooling to room temperature. Yield: 10.5 grams (47% of the theoretical yield). By recrystallization from ligroin with addition of animal charcoal there are obtained colorless needles melting at 104–105° C. The base distils in the bulb at an air bath temperature of 121° C. under a pressure of 0.015 mm. of mercury.

Hydrochloride: melting point 203–205° C., colorless rhombs (from alcohol/ether).

Perchlorate: melting point 197–199° C., colorless needles (from water).

*Example 18*

10.31 grams of gamma-amino-butyric acid, 16.7 grams of 1,2-diphenoxyethane and 90 grams of polyphosphoric acid ($P_2O_5$ content about 83%) are heated, while stirring mechanically, for 6 hours at 110° C. The light brown sirupy reaction mixture is worked up as described in Example 1. Instead of with ether the pyrroline base is extracted with methylene chloride. The 4,4'-bis-($\Delta^1$-pyrrolinyl-2)-diphenoxyethane is obtained in the form of almost colorless crystals. Yield: 16.2 grams (93% of the theoretical yield). After recrystallization from methylene chloride or methanol there are obtained colorless irregular crystals melting at 225° C. Perchlorate: melting point 274° C., colorless needles and fibres.

*Example 19*

10.31 grams of gamma-amino-butyric acid, 16.0 grams of 1,4-bis-(2-methoxyphenoxy)-butane and 90 grams of polyphosphoric acid ($P_2O_5$ content about 83%) are heated, while stirring mechanically, for 3 hours at 100° C. The red sirupy reaction mixture is worked up as described in Example 1. The 4,4'-bis-($\Delta^1$-pyrrolinyl-2-)-2,2'-dimethoxyphenoxy-butane-(1,4) is obtained as evaporation residue of the ether extracts in the form of a red-brown oil which crystallizes after some time. Yield: 11.15 grams (51% of the theoretical yield). After recrystallization from ligroin or benzene there are obtained colorless needles melting at 147° C.

*Example 20*

10.31 grams of gamma-amino-butyric acid, 13.82 grams of hydroquinone dimethyl ether and 180 grams of polyphosphoric acid ($P_2O_5$ content about 80%) are heated, while stirring mechanically, for 1 hour at 80° C. The red reaction mixture is worked up as described in Example 1. After evaporation of the ether extracts the 2-(2,5-dimethoxy-phenyl)-$\Delta^1$-pyrroline is obtained as a yellow oil which crystallizes upon distillation in the bulb tube at an air bath temperature of 88–90° C. under a pressure of 0.005 mm. of mercury. After recrystallization from petroleum ether with addition of animal charcoal the base is obtained in the form of colorless needles melting at 63° C. The yield amounts to 17.8 grams (86.8% of the theoretical yield).

The hydrochloride, obtained by addition of ether/hydrogen chloride to the ether solution of the base, crystallizes from alcohol/ether in the form of yellow needles melting at 204° C. In ultraviolet light it shows strong yellow-green fluorescence.

We claim:

1. The compound of the formula

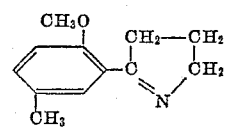

2. The compound of the formula

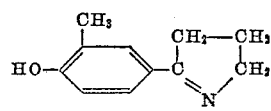

3. The compound of the formula

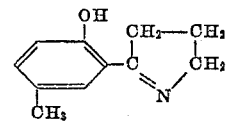

4. The compound of the formula

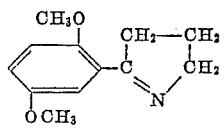

5. A member of the group consisting of heterocyclic bases of the formula

wherein Z is a member of the group consisting of trimethylene and tetramethylene and R is a member of the group consisting of

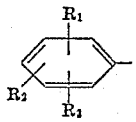

and

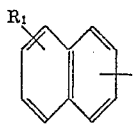

wherein $R_1$ is a member of the group consisting of hydroxy, methoxy, methylthio, halogen-alkoxy of up to two carbon atoms, and carbomethoxy, $R_2$ is a member of the group consisting of hydrogen, chloride, methyl, methoxy, and, taken together with $R_1$, and ethylenedioxy group, and $R_3$ is a member selected from the group consisting of hydrogen and methoxy, and acid addition salts of said compounds with the member of the group consisting of organic carboxylic acids having up to seven carbon atoms and inorganic acids.

6. A process for preparing heterocyclic bases which comprises condensing an aromatic alkoxy compound of the group consisting of

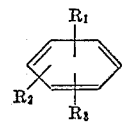

and

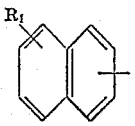

wherein $R_1$ is a member of the group consisting of hydroxy, methoxy, halogen-alkoxy of up to two carbon atoms, methylthio, and carbomethoxy, $R_2$ is a member of the group consisting of hydrogen, chlorine, methyl, methoxy, and, taken together with $R_1$, an ethylenedioxy group, and $R_3$ is a member selected from the group consisting of hydrogen and methoxy, in polyphosphoric acid with a member of the group consisting of primary gamma- and delta-amino-carboxylic acids of the formula $$HOOC—Z—NH_2$$

in which Z is a member of the group consisting of trimethylene and tetramethylene, the methyl esters and ethyl esters and the salts of inorganic acids and bases thereof.

7. A member of the group consisting of heterocyclic bases of the formula

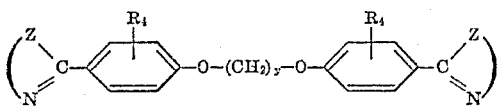

wherein Z is a member of the group consisting of trimethylene and tetramethylene, $R_4$ is a member of the group consisting of hydrogen and methoxy, and Y is an integer from 2 to 4, and acid addition salts of said compounds with a member of the group consisting of organic carboxylic acids having up to seven carbon atoms and inorganic acids.

8. A process for preparing heterocyclic bases which comprises condensing a compound of the formula

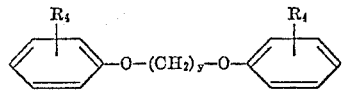

wherein $R_4$ is a member of the group consisting of hydrogen and methoxy, and Y is an integer from 2 to 4, in polyphosphoric acid with a member of the group consisting of primary gamma- and delta-amino-carboxylic acids of the formula $$HOOC—Z—NH_2$$

in which Z is a member of the group consisting of trimethylene and tetramethylene, the methyl esters and ethyl esters and the salts of inorganic acids and bases thereof.

References Cited in the file of this patent

Cloke et al.: "J. Am. Chem. Soc.," volume 67, pages 2155–2158 (1945).

Kloetzel et al.: "J. Am. Chem. Soc.," volume 79, pages 4222–4225 (1957).